United States Patent [19]

Cheesman

[11] 4,199,456
[45] Apr. 22, 1980

[54] APPARATUS FOR A SCREEN ASSEMBLY FOR REMOVING SOLIDS FROM FLUIDS

[75] Inventor: William D. Cheesman, Houston, Tex.

[73] Assignee: Royce Equipment Company, Houston, Tex.

[21] Appl. No.: 20,971

[22] Filed: Mar. 16, 1979

Related U.S. Application Data

[63] Continuation of Ser. No. 809,756, Jun. 24, 1977, abandoned.

[51] Int. Cl.² .............................................. B01D 25/04
[52] U.S. Cl. ............................ 210/232; 55/DIG. 31; 55/492; 55/496; 210/499
[58] Field of Search ............ 210/402, 403, 404, 497.1, 210/499, 232; 140/108; 55/DIG. 31, 492, 494, 499, 496

[56] References Cited

U.S. PATENT DOCUMENTS

| | | | |
|---|---|---|---|
| 1,615,559 | 1/1927 | Tork | 210/499 |
| 1,729,197 | 9/1929 | Whann | 210/499 |
| 2,288,883 | 7/1942 | Bixby | 210/499 |
| 2,837,210 | 6/1958 | Ackert et al. | 210/499 X |
| 2,907,404 | 10/1959 | Mare | 210/499 |
| 3,053,394 | 9/1962 | Morrison | 210/499 |
| 3,123,558 | 3/1964 | Sullivan | 210/499 |
| 3,515,281 | 6/1970 | Volp et al. | 210/402 |
| 3,880,761 | 4/1975 | Jellesma | 210/404 |
| 4,045,853 | 9/1977 | White | 210/402 X |

Primary Examiner—Theodore A. Granger
Attorney, Agent, or Firm—Pravel, Gambrell, Hewitt, Kirk, Kimball & Dodge

[57] ABSTRACT

An inlet screen assembly having the filter screen tensioned in only one direction when mounted on a frame which prevents distortion of the filter screen openings and which may be used to filter extremely fine solids from the influent. The screen assembly provides a large flow capacity with a minimum pressure differential that may be used in any type intake facility and is suitable for use in either a stationary or movable screen water intake facility.

4 Claims, 4 Drawing Figures

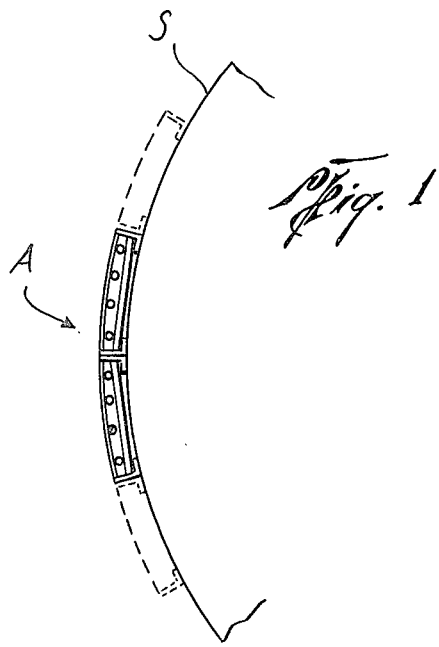
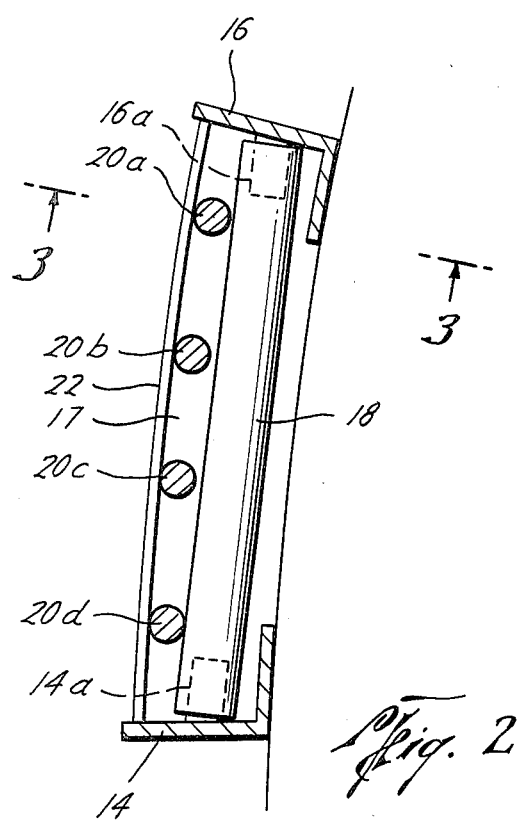
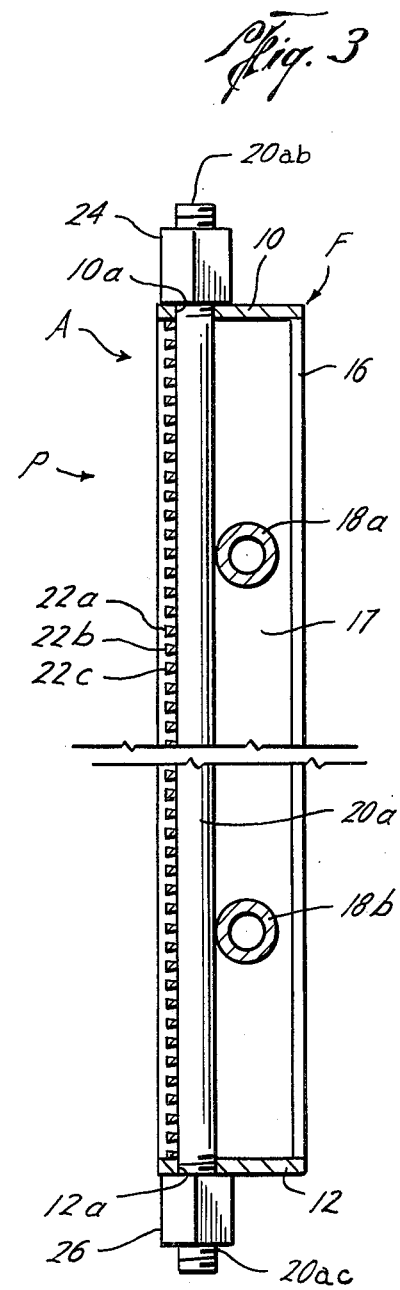

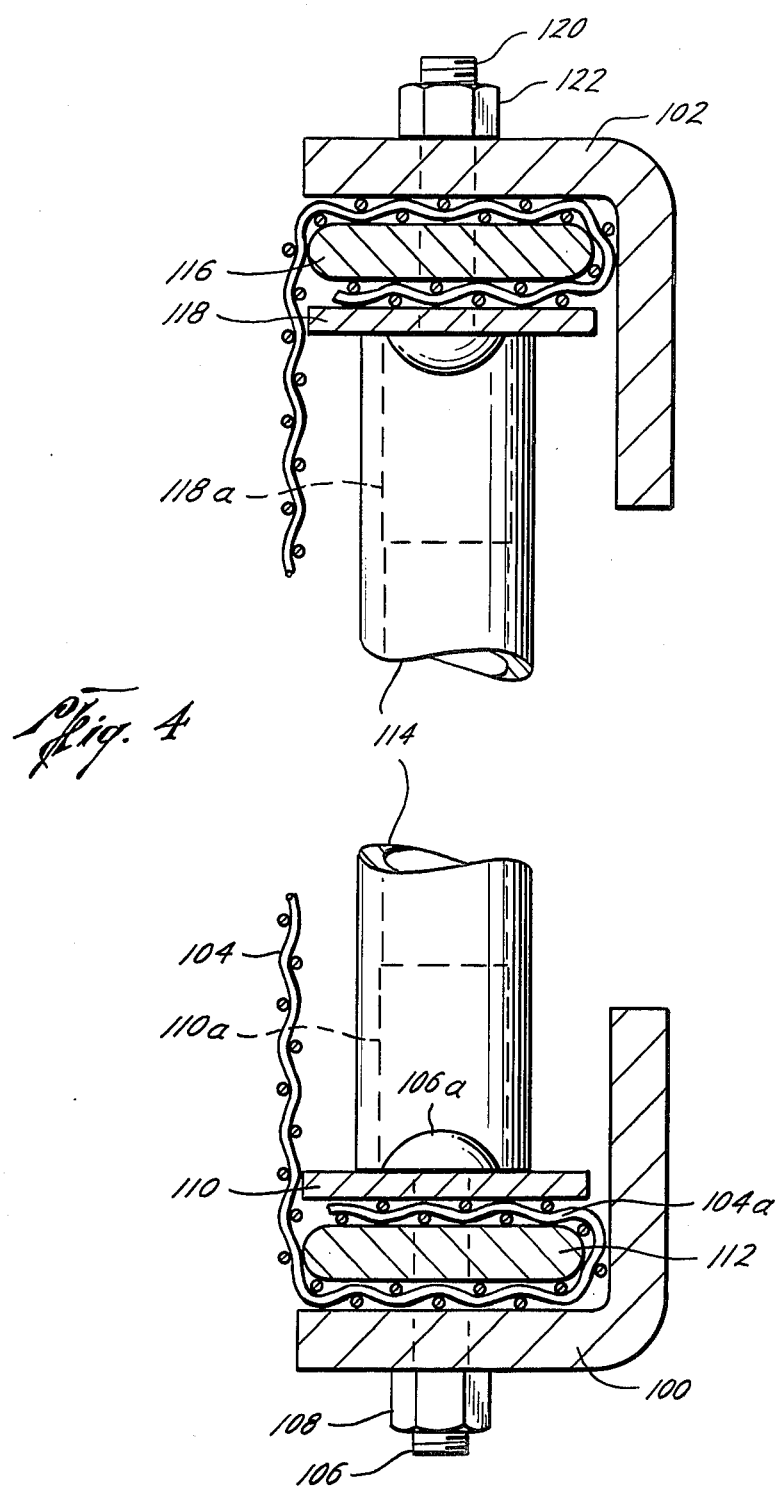

APPARATUS FOR A SCREEN ASSEMBLY FOR REMOVING SOLIDS FROM FLUIDS

This is a continuation of application Ser. No. 809,756, filed June 24, 1977, now abandoned.

CROSS REFERENCE TO RELATED APPLICATIONS

This application is related to my co-pending applications which are hereby totally incorporated herein by this specific reference for any and all purposes and which are as follows:

| Serial No. | Filed | Attorney Docket No. | Title |
|---|---|---|---|
| 664,435 | 3/8/76 | now abandoned | Bar Screen Apparatus |
| 809,755 | 6/24/77 | now abandoned | Hydrostatic Traveling Water Screen |

BACKGROUND OF THE INVENTION

This invention relates to the field of filter screens and particularly to water inlet screens for removing undesired solid debris and the like above a certain size from a source of water.

There are many agricultural, municipal and industrial needs for large volumes of water. One very common need is for cooling water in an electrical generating facility, but many other uses will be readily apparent to those skilled in the art. A common preliminary water treatment step for all of these needs is to screen or filter undesired solid material from the water. See, for example, U.S. Pat. No. 2,995,252 to Belton, et al. If not removed, such undesired solids may damage pumps, plug flow lines and create numerous other operational problems in subsequent treatment and use of the water.

Many forms of water intake screens are known. One common type of intake screen is the traveling screen comprising an endless series of pivotally interconnected substantially flat screen panels. An example of a tension screen having an edge seal strip is disclosed in U.S. Pat. No. 3,666,277. Some of the traveling screen systems are equipped with backwash means for removing the filtered solids from the screen as well as fish and other forms of marine life. Some examples of such traveling screens may be found in the following U.S. Patents:

| | | |
|---|---|---|
| 414,887 | 2,851,162 | 3,093,578 |
| 495,023 | 2,899,062 | 3,591,006 |
| 1,881,270 | 2,899,067 | 3,802,565 |
| 2,291,103 | 2,963,152 | 3,872,006 |
| 2,525,516 | 3,018,893 | 3,976,573 |

Other types and shapes of filters are also known to those skilled in the art. For example, see U.S. Pat. No. 2,679,936 for a rotating drum type filter and U.S. Pat. No. 2,996,189 for a mesh filter screen panel fabricated entirely of plastic.

In general, these prior art water inlet filters have used a woven wire filter screen with a desired size mesh opening stretched on a frame mounted on the intake structure. The screens were randomly stretched in two directions when mounted on the rectangular frame and since tensioning was not uniformly applied to each screen wire, localized areas of higher wire stress were created. An example of an attempt to overcome this problem is disclosed in U.S. Pat. No. 3,447,474 to Malfroy, et al. In general the desired size screen openings were either enlarged or distorted in the areas of higher screen wire stress which would allow passage of oversize solids. See U.S. Pat. No. 3,684,091 to Wehner for an attempt to overcome this problem using elastic supporting strips separate from the plate filter screen. While oversize filter openings were not critical in water intake systems able to tolerate passage of relative large solids, such distortion was unacceptable in systems requiring a relatively high degree of filtration. Such fine filter screens have openings in the range of 0.030 to 0.050 in. rather than ⅜ in. (0.375 in.) to ½ in. (0.500 in.) mesh opening or the like in the prior art water filter screens. The localized areas of higher stress also tended to structurally weaken the filter screen and therefore limited the differential head and attendant flow capacity that could be safely taken through the screen.

The present invention contemplates the use of mesh type filter screens. It has long been recognized that the "warp" and "woof" strands of such mesh filter screen when subjected to such uneven tension resulted in random knuckle heights which distorted the filter screen. See U.S. Pat. No. 3,473,576 for disclosure relating to the "warp" and "woof" weave strands.

The present invention also relates to tubular well screen means of the type disclosed in U.S. Pat. Nos. 3,584,685, 3,667,615 and 3,561,605. In general, these patents related to the fabrication of rust-resistant stainless steel metallic well screens of a cylindrical shape which comprise a multiplicity of longitudinally extending bars or rods held in spaced parallel relationship by continuous wedge-shaped screen member which is joined to the longitudinal bar members at each crossing point by welding the joint. The spacing of the turns of the continuous screen member determines a helical flow slot width which is held uniformly within a small tolerance for efficient screen performance. In general, these screen means are fabricated by rotating a substantially cylindrical group of longitudinal bar members spaced on a mandrel about its longitudinal axis while a continuous screen member is simultaneously fed substantially tangientially to the group of longitudinal bar members. The continuous screen member is fused to each longitudinal bar member at the point of contact, typically by electrical resistance welding, while rotating the group of bar members as a unit and simultaneously advancing the screen wrap wire longitudinally at a constant rate of speed to form a free standing "cage type" unit as disclosed in U.S. Pat. No. 3,958,634. The resulting well screen product has the advantage of a high structural strength in combination with a high fluid capacity while excluding very fine particulated solids away from the fluid inlet system.

SUMMARY OF THE INVENTION

The present invention relates generally to the field of filter screens and in particular to filter screens for use in water intake facilities.

A filter screen panel is mounted on a suitable frame means for tensioning the panel in only one direction to eliminate undesired tensioning stresses that distort the predetermined size of the fine screening flow openings. The flow openings are formed between a plurality of screen members that are secured at substantially right angles with a plurality of parallel tensioning members to form the filter screen panel. The panel is structurally mounted with the frame means by the tensioning members which are prestressed in only one direction and a desired level which does not distort the size of the fine filter flow openings while providing a large capacity filter screen with a minimum pressure drop.

BRIEF DESCRIPTION OF THE DRAWINGS

FIG. 1 is a top view illustrating sectional views of two of the filter screens of the present invention vertically mounted on the periphery of a circular intake structure;

FIG. 2 is a cross-sectional view similar to FIG. 1 that illustrates in greater detail the construction of the filter screen;

FIG. 3 is a side view taken along lines 3—3 of FIG. 2; and

FIG. 4 is a view similar to FIG. 3 of another embodiment of the filter screen of the present invention.

BRIEF DESCRIPTION OF THE PREFERRED EMBODIMENT

The filter screen apparatus A provides a barrier to undesired solids from flowing with the fluid from the exterior of the circular intake structure S to the interior thereof where the influent is then communicated to a desired location for further use. While water is the intended influent for use with the present invention, the filter screen apparatus is equally adapted for use with other fluids. It is also to be understood that the filter screen apparatus A of the present invention is equally well suited for a movable screen water intake facility such as that disclosed in my copending application Ser. No. 664,435, filed Mar. 8, 1976, now abandoned and entitled "Bar Screen Apparatus" as the fixed intake structure S.

As best illustrated in FIG. 3, the filter screen apparatus A of the present invention includes a frame means, generally designated F, mounting a filter screen panel that is generally designated P.

The filter screen frame means F includes a pair of spaced steel attachment plate members 10 and 12 that are disposed in substantially parallel arrangement a predetermined distance apart. Preferably, the attachment members 10 and 12 are disposed horizontally in a vertical plane when mounted on the structure S for a purpose that will become more apparent hereinafter.

As best illustrated in FIG. 2, a pair of parallel and vertically disposed cross beam members 14 and 16 are connected at their opposite ends with the edges of the spaced attachment members 10 and 12 at right angles for holding the attachment members 10 and 12 the predetermined distance apart and form a generally rectangular frame having a central flow opening 17 bounded by members 10, 12, 14 and 16. To provide sufficient structural rigidity, the cross beam members 14 and 16 are preferably formed of steel angles which have greater strength for resisting bending forces applied to the members 14 and 16 between end member 10 and 12. The illustrated rectangular frame with the central opening 17 is preferred, but many variations to the shape of the frame means F will be readily apparent to those skilled in the art.

As best illustrated in FIG. 2, the cross beam members 14 and 16 have mounted thereon inwardly projecting cylindrical lugs 14a and 16a which fit within the inner bore of a tubular frame spacer or support bar 18. The horizontal spacer bar 18 is disposed parallel to the attachment members 10 and 12 and used to support the screen panel P against the differential pressure forces in the water resulting from filtering the flow. Any desired number of spacer bars 18 may be used and a plurality of two spacer bars 18a and 18b are illustrated in FIG. 3.

The filter screen panel P is fabricated in accordance with the well screen patents previously discussed and includes the longitudinally extending tensioning members or rods 20a, 20b, 20c and 20d that are placed upon the fabrication mandrel in circumferentially spaced parallel relationship about the outer surface thereof. The screen means of the filter screen panel P is provided by the helically wound continuous screen wire that is wrapped about the mandrel and welded to each of the tensioning member rods 20 at substantially right angles. In the embodiment illustrated in FIG. 2, four tensioning rods 20a, 20b, 20c and 20d are illustrated but it is to be understood to those skilled in the art that more or fewer tensioning rods may be used with the present invention.

The special shaped screen wire, flat bottomed and keystone-shaped, that is wrapped spirally on the rod provides a self-cleaning feature since any material passing the smaller portion of the opening easily passes through the larger tapered portion of the slot opening. Technically, the screen wire has a cross section of a trapezoid with the shorter parallel edge welded to the tension rod 20a as illustrated in FIG. 3. This screen wire shape resists clogging as it offers a freer passageway for the fluid after it leaves the screening point of the wire. The screen wire may be furnished in any gauge opening desired from 0.004 in. up, and with any diameter ranging from ¾ in. to 20 in. The gauge openings range from 0.004 to 0.045 in. and the wrap wire may be inverted for screening with the tension rods disposed upstream of the screen wire.

After the free standing well screen unit is formed, it is removed from the fabrication mandrel and the continuous screen wire is cut along a longitudinal section parallel with the tensioning members. In cutting the continuous screen wire 22 along the longitudinal axis a plurality of screen wire members 22a, 22b, 22c, etc. in parallel relationship are created with the opening between the screen members providing the opening of predetermined size. The well screen is then flattened, by suitable metal working methods, such as by reverse rolling, to provide the substantially flat filter screen panel as illustrated in FIGS. 2 and 3. While the screen wire 22 is helically wound about the tensioning rod, the intersection of the screen wire 22 and the tension rods 20a, 20b, 20c and 20d is substantially a right angle intersection and accordingly after flattening tensioning of the tensioning members 20 will not have a tendency to distort the opening between the typical parallel frame members that have been designated 22a, 22b and 22c in FIG. 3.

As illustrated in FIG. 3 the tensioning rod 20a is provided with threaded ends 20b and 20c that extend through openings 10a and 12a of the attachment plates 10 and 12, respectively. The threaded ends 20b and 20c are threadedly engaged by nuts 24 and 26, respectively, which bear against the attachment plates 10 and 12 to tension the tension members 20a to a predetermined desired level. The screen wires 22a, 22b, 22c, etc. are not attached to the frame means F and are therefore not subjected to any cross tension loading when securing which tends to distort or create oversize openings in the filter screen panel P between the screen members 22a, 22b and 22c. As the tensioning of the tension members 20a, 20b, 20c and 20d can be carefully controlled, no strain is placed on the screen wires and the uncertainty of localized areas of high strain that can lead to screen failure are eliminated. The tensioning members 20a, 20b, 20c and 20d rest against the horizontally spaced support bars 18 which provide support for the tensioning rods at spaced locations along their length and which reduce the effective beam length stress loading of the tensioning rods 20a, 20b, 20c and 20d for withstanding the forces resulting from pressure differential occuring as the water flows through the screen openings.

One desirable embodiment of the filter screen panel provides openings of 0.040 in. between the screen members which have a smaller edge width of 0.030 in. and a greater edge width of 0.078 in. The tension rods are preferably 0.187 in. (3/16 in.) round stainless rods with a center point span between the rods of 1.2 in. with the filament woven epoxy spreader bars 18 apart at no greater than a vertical distance of 12.0 in. The metal filter screen panel is preferably formed of monel or a stainless steel which is highly resistant to water environment corrosion. With such an arrangement the tensioning members 20a, 20b, 20c and 20d can be pretensioned to a load of 316 lb. per rod which creates a 9000 psi tension stress and which is well within the acceptable stress limits of the material and produces minimal strain defunction of the rods between screen wires. The spring of the spreader bar 18 from the screen panel P by the tensioning member 20 greatly increases the flow capacity of the screen. Despite such capacity, the filter will reject undesired solids having a diameter greater than 0.040 in.

Another embodiment of the filter screen apparatus A is illustrated in FIG. 4 and which is a view similar to that of FIG. 2. This embodiment employs a woven mesh filter screen having square shaped openings formed between metal "woof" and "warp" strands of uniform diametric size wire attached to a rectangular frame similar to that of FIGS. 1 and 2. The spaced apart parallel attachment members 100 and 102 are held in that relationship by suitable end supports (not illustrated) in the known manner.

The "woof" strands of the woven mesh filter screen 104 are secured to attachment member 100 along its entire length using the suitable securing means, for example, by a plurality of bolting such as the illustrated threaded bolt 106 and nut 108. Bolt head 106a engages back up lock plate or strip 110 for holding lock plate 110 in engagement with the portion 104a of the screen 104 disposed between the lock plate 110 and the securing strip 112. By folding the screen 104 about the lock strip 112 and securing with lock strip 110 along the length of attachment member 100, a very reliable end connection of the screen 104 to the frame is achieved. In addition, the attachment securing strip 110 is provided with a plurality of inwardly projecting lugs designated 110a which receive one end of the tubular spacer bar 114 for imparting additional rigidity to the filter screen panel. Such spacer bars 114 are preferably disposed about 12 in. apart along the length of the attachment strip member 110.

The other end of the "woof" strands are secured the length of attachment member 102 by securing member 116 and locking member 118 using threaded bolt 120 and nut 122 in a similar mount. The attachment strip 118 is provided with a corresponding set of lugs 118a for receiving the other end of the tubing spacer bar 114.

While the "woof" strands are shown as being attached to the attachment members 100 and 102 it is to be understood with the "warp" strands are not to be secured to the frame means and they will remain under essentially zero tension. By pre-tensioning the secured "woof" strands a greater pressure differential loading on the screen resulting from the fluid flow can reliably be tolerated.

Operation

In use and operation of the present invention the well screen panel is fabricated in the known manner and is flattened by suitable means which preferably is reversed rolling. With the ends 20b and 20c of the tension rod threaded to receive the tension bolts 24 and 26 and inserted through the opening 10a and 12a in the attachment plates 10 and 12, respectively, the fabrication of the frame F is completed by suitable securing means, such as welding. The nuts 24 and 26 are then tightened sufficiently to tension the tension rods 20a, 20b, 20c and 20d to the desired level which in the case of the 3/16 in. diameter rods is 316 lbs. per rod for the 9000 psi stress.

With the filter screen apparatus A so assembled the frame means F is then mounted on the inlet structure S in a suitable manner such as by bolting (not illustrated). Thereafter water flowing between the screen members 22a, 22b, 22c, etc. will exclude undesired solids larger than the predetermined distance between the screen members 22a, 22b, 22c, etc. while enabling passage of a large volume of water flow with a minor differential head or pressure drop across the screen. The forces resulting from the pressure drop across the screen is of course resisted by the frame spacer bars 18a and 18b as well as the tensioning members 20a, 20b, 20c and 20d.

In the use and operation of the embodiment of FIG. 4, one "woof" strand edge of the screen is secured in the manner illustrated, for example, using threaded bolt 120 and nut 122. The screen 104 is then pre-tensioned to a desired level per strand and with that pre-tension being maintained on the "woof" strands of the mesh screen 104 the bolt 106 and nut 108 is made up to maintain that desired level of pre-tension. The "warp" strands are, of course, not subjected to any tension. The screen panels then may be used on a carousel-type circular inlet arrangement as illustrated in FIG. 1 or the panels may be used on a traveling screen arrangement such as disclosed in the prior art patents disclosed hereinabove.

The width of the filter screen apparatus A may be controlled within limits by selecting the diameter of the mandrel upon which the well screen is fabricated, but for convenience it has been found that a 24 in. pitch for the filter screen apparatus A is preferred.

The present invention provides a filter screen in which the screening members are used for that purpose and not as structural members. This preserves the integrity of the screen opening as well as providing a reliable manner of attaching the screen to its support. Furthermore, fewer filter openings may be employed at high capacity since smaller size screening members may be used. This is achieved without any sacrifice in marine life protection which is actually enhanced by the smaller filter openings. Also the back side of the screen mesh is structurally clear so that brush cleaning and/or water back flush screen cleaning is feasible.

The present invention provides an attachment method of the screen that securly and uniformly grips the screen panel while pre-tensioning to a desired level. Such attachment increases screen reliability and effective useful life, while reliably providing for higher flow capacity.

The foregoing disclosure and description of the invention are illustrative and explanatory thereof, and various changes in the size, shape and materials as well as in the details of the illustrated construction may be made without departing from the spirit of the invention. Furthermore, any patent or application identified herein is hereby incorporated in and forms part of this disclosure.

I claim:

1. A filter screen apparatus, including:
   frame means having a first attachment member and a second attachment member arranged in substantially parallel relationship and spaced apart a preselected distance;
   said frame means having cross-beam means connected with said attachment members for holding said attachment members spaced apart the preselected distance;
   screen means for forming openings of predetermined size through which fluid may flow and which blocks passage of solids larger than a predetermined size;
   said screen means having a plurality of tension members disposed in parallel relationship and each having a support surface lying in a common plane with the support surface of the other tension members for tensioning said screen means in a desired manner, each of said plurality of tensioning members connected at one end of said first attachment member and at the other end to said second attachment member;
   each of said plurality of tension members having means for tensioning said tension member to a desired level of structural strength without deforming said screen openings from their predetermined size by strain resulting from the tensioning; and
   said screen means having a plurality of screen members disposed in parallel relationship and spaced apart a predetermine distance, said plurality of screen members disposed at substantially a right angle to said tensioning members on said support surfaces for forming a substantially planar filter screen panel for positioning the openings of predetermined size from said tension members, said screen members secured solely to said tension members and free of attachment to said frame means, and each of said screen members having substantially zero tension therein to minimize deforming of the flow openings of predetermined size between said screen members when said plurality of tensioning members are tensioned to the desired level.

2. The filter screen apparatus of claim 1, including:
   each of said plurality of screen members welded to all of said tensioning members.

3. The filter screen apparatus of claim 1, including:
   said screen members formed of wedge-shaped screen wire welded to said tensioning members.

4. The filter screen apparatus of claim 1, wherein:
   said frame means includes a plurality of spacer bars disposed in substantially parallel relationship with each other and perpendicular to said tension members and extending between said first and second attachment members and secured with said cross-beam means for supporting said tension members against the hydrostatic head lateral forces resulting from flow through said screen means.

* * * * *